US005855295A

United States Patent [19]

Lee

[11] Patent Number: 5,855,295

[45] Date of Patent: Jan. 5, 1999

[54] AUTOMATIC WASHING APPARATUS AND METHOD OF WASHING AUTOMATIC VENDING MACHINES

[75] Inventor: Hee-Soo Lee, Kwangju, Rep. of Korea

[73] Assignee: Kwangju Electronics Co., Ltd., Kwangju, Rep. of Korea

[21] Appl. No.: 883,271

[22] Filed: Jun. 26, 1997

[30] Foreign Application Priority Data

Jul. 13, 1996 [KR] Rep. of Korea .................. 1996-20755
Jul. 13, 1996 [KR] Rep. of Korea .................. 1996-20756

[51] Int. Cl.[6] ................................ B67B 7/00; B67D 5/56; B08B 3/00; G01B 11/02

[52] U.S. Cl. ........................... 222/1; 222/148; 222/129.1; 356/356; 134/34

[58] Field of Search ................................ 222/129.1, 148, 222/1; 134/34; 356/356

[56] References Cited

U.S. PATENT DOCUMENTS 3,253,740 5/1966 Keyes ...................................... 222/148
3,623,052 11/1971 Spiller ...................................... 222/52
3,713,743 1/1973 Simms ..................................... 356/208

FOREIGN PATENT DOCUMENTS 403273392 12/1991 Japan ..................................... 222/148

*Primary Examiner*—Andres Kashnikow
*Assistant Examiner*—Keats Quinalty
*Attorney, Agent, or Firm*—Merchant, Gould, Smith, Edell, Welter & Schmidt

[57] ABSTRACT

An automatic washing apparatus and method for washing an inner part of a drink mixing part of an automatic beverage vending machine is disclosed. The apparatus and method enables the drink mixing part to be automatically washed depending on the pollution level in the part. Thus, a purchaser of goods from the machine can use a clean vending machine. The automatic washing apparatus has a pollution detecting part for detecting the pollution level in the drink mixing part. If it is determined that the drink mixing part has a pollution level higher than desired, a control part generates a signal to supply hot water to wash the drink mixing part.

4 Claims, 6 Drawing Sheets

AUTOMATIC WASHING APPARATUS AND METHOD OF WASHING AUTOMATIC VENDING MACHINES

BACKGROUND OF THE INVENTION

1. Field of the Invention

This invention relates, in general, to an automatic vending machine, and more particularly to an automatic washing apparatus and method for washing an inner part of a drink mixing part. The timing of the washing is dependent on the level of pollution in the inner part.

2. Description of the Prior Art

Automatic vending machines have been widely used in many countries for keeping and dispensing various goods such as coffee, cigarettes, cakes, and candy. The vending machines generally have a transparent chamber for holding the goods, so that users can view the available goods.

FIG. 1 is an inner constructive view of a typical automatic vending machine used for vending beverages such as coffee and tea. As shown in the drawing, the typical automatic vending machine includes a housing 10 that is the external most portion of the vending machine. A source vessel 12 for storing various beverage source materials, such as coffee and tea, is mounted inside the housing 10. A source supply part 5 supplies the beverage source material stored inside the source vessel 12. A source shoot 14 is mounted at a lower side of the source supply part 5, for guiding the movement of the beverage source material from the source supply part 5. A hot water supply part 6 supplies hot water. A drink mixing part 7 mixes the beverage source material guided through the source shoot 14 and the hot water supplied from the hot water supply part 6.

FIG. 2 is a schematic block diagram of a typical automatic beverage vending machine. As shown in the drawing, the automatic vending machine includes a coin detecting mechanism 1 that provides a signal according to the amount of the coins inserted in the vending machine. The automatic vending machine further includes a goods selecting part 2 for selecting an article from the available goods, and a control part 3 for generating a control signal to display the status of the goods related to the amount of the coins inserted, as detected by the coin detecting mechanism 1. The control part 3 further controls the supply of the beverage source material and hot water needed for the goods as selected from the goods selecting part 2. A display part 4 is included for displaying the total amount of coins inserted and the status of the automatic vending machine. Also included is a source supply part 5 for supplying the beverage source according to a signal from the control part 3, a hot water supply part 6 for supplying the hot water, and a drink mixing part 7 for mixing the beverage source material supplied from the source supply part 5 and the hot water supplied from the hot water supply part 6. The mixed beverage is extracted through a nozzle that is part of mixing part 7.

Additional details regarding the goods selecting process and operating process of conventional automatic vending machines will be explained hereinafter.

When currency, such as coins and bills, is inserted through a inserting slot (not shown), the condition of the coins or bill and the value of coins or bill is detected by a plurality of sensors (not shown) of the coin detecting mechanism 1, and a signal is provided to the control part 3. The control part 3 generates a signal for display part 4 to display the total inserted amount according to the signal from the coin detecting mechanism 1. The display part 4 displays the selection possibilities according to the control part 3, such as when the total inserted amount of coins exceeds the price of the goods available from the automatic vending machine.

After the selection availability shown in the display part 4 has been displayed, a selecting button is pushed by the user, which causes the selected goods to be extracted from the automatic vending machine. A signal corresponding to the goods selected is provided to the control part 3. At this time, control part 3 generates a control signal to supply the beverage source material and hot water corresponding to the goods selected by the user, and to mix the beverage source material and the hot water.

Accordingly, after the beverage source material has been supplied from the source vessel 12 through the source supply part 5 by a signal from the control part 3, the beverage source material is supplied to the drink mixing part 7 through the source shoot 14. Simultaneously, hot water is supplied from the hot water supply part 6 to the drink mixing part 7 according to a signal from the control part 3.

Subsequently, after the beverage source material from the source vessel 12 and the hot water from the hot water supply part 6 has been mixed in the drink mixing part 7, the mixed beverage is extracted through the nozzle and presented to the user.

However, a problem exists in the above automatic vending machine in that all of the beverage mixed in drink mixing part 7 is not extracted from drink extracting part 8. A portion of the beverage remains in the drink mixing part 7, resulting in an inner part of the drink mixing part 7 being polluted, thereby causing a unsanitary state of the automatic vending machine. Further, maintenance of the vending machine is inconvenient because it requires manually washing the inner part of the drink mixing part.

SUMMARY OF THE INVENTION

It is, therefore, an object of the invention to provide an automatic washing apparatus and a method for automatically washing an automatic vending machine, in particular, an inner part of a drink mixing part. The washing is done according to the pollution level in the drink mixing part. Thus, a user of the machine is using a clean vending machine.

In order to accomplish the above object, there is provided an automatic washing apparatus comprising:

a pollution detecting part for detecting a pollution level of a drink mixing part; and a control part for generating a control signal to a hot water supply part to supply hot water, to wash the drink mixing part when the drink mixing part is determined to be polluted according to the pollution level detected through the pollution detecting part.

In accordance with another object of the present invention, there is provided a method for washing an automatic vending machine, the method comprising the steps of:

detecting a pollution level in a drink mixing part after having initialized with predetermined input parameters according to a control signal after AC voltage from an external source is provided to the automatic vending machine;

determining if the drink mixing part is polluted according to the pollution level detected through the pollution detecting part;

washing the drink mixing part with hot water supplied by a hot water supply part to the drink mixing part; and discharging the water from the drink mixing part after a predetermined time, stopping the supply of hot water from the hot water supply part, and stopping the drive of the drink mixing part.

BRIEF DESCRIPTION OF THE DRAWINGS

For a fuller understanding of the nature and object of the invention, reference should be made to the following detailed description taken in conjunction with the accompanying drawings in which.

DETAILED DESCRIPTION OF THE PREFERRED EMBODIMENTS

The invention will now be described in detail with reference to the accompanying drawings.

Figure 1:
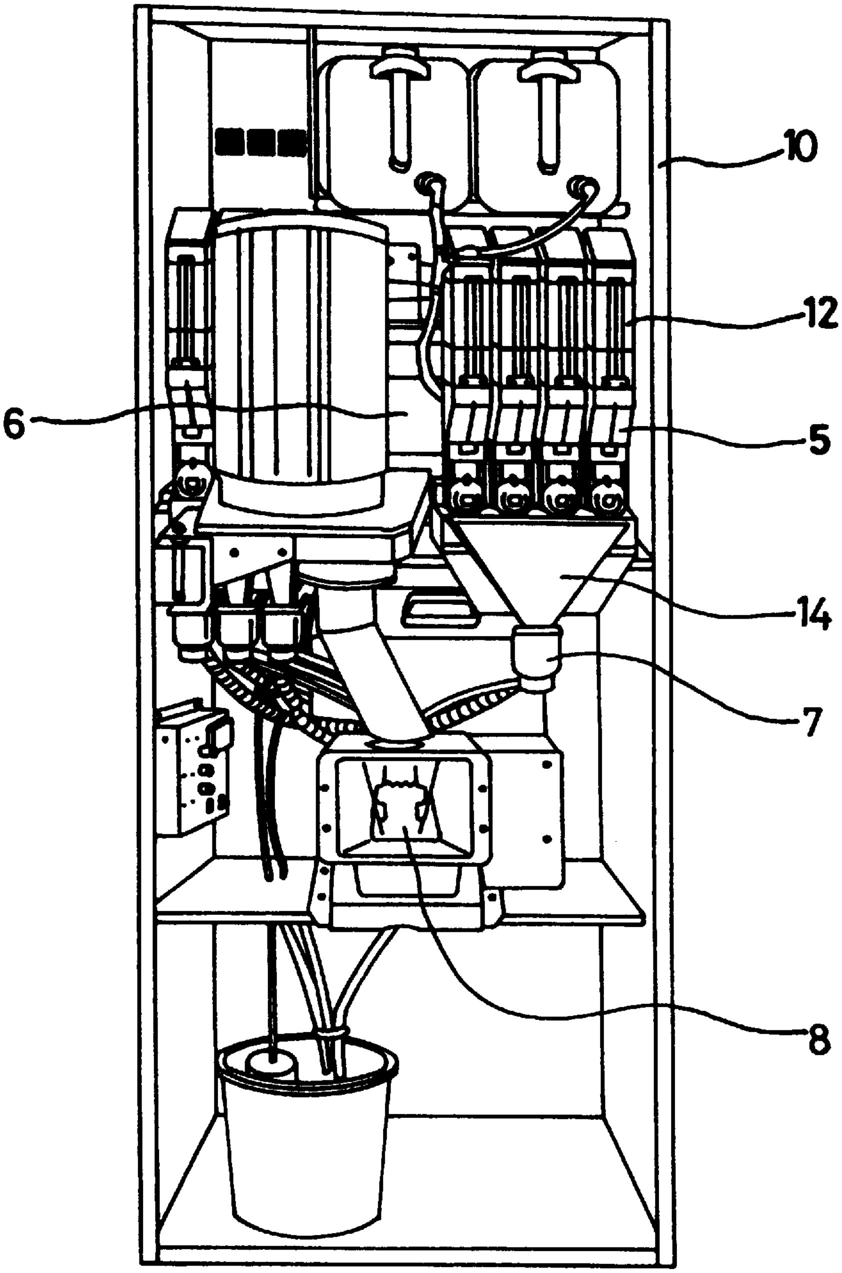
FIG. 1 (PRIOR ART)
FIG. 1 is an inner constructive view of a conventional automatic vending machine.
Figure 2:
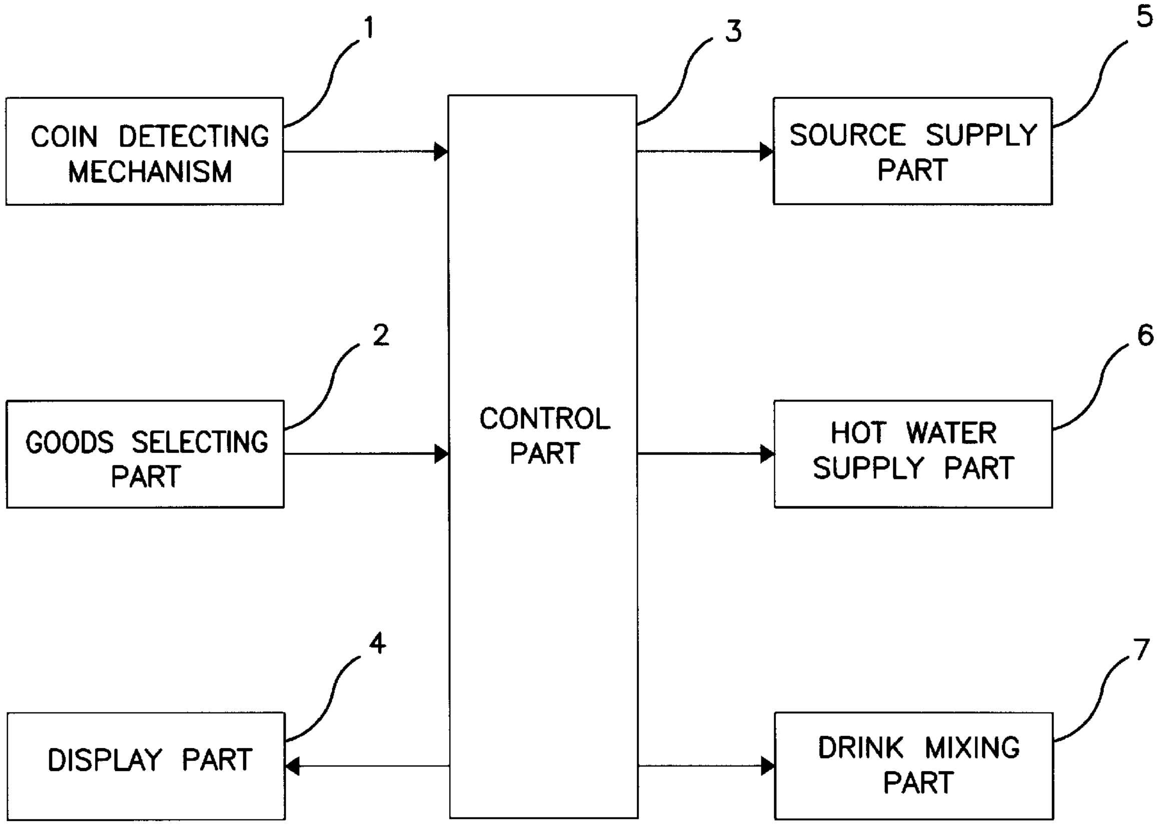
FIG. 2 (PRIOR ART)
FIG. 2 is a schematic block diagram of a conventional automatic vending machine such as shown in FIG. 1.
Figure 3:
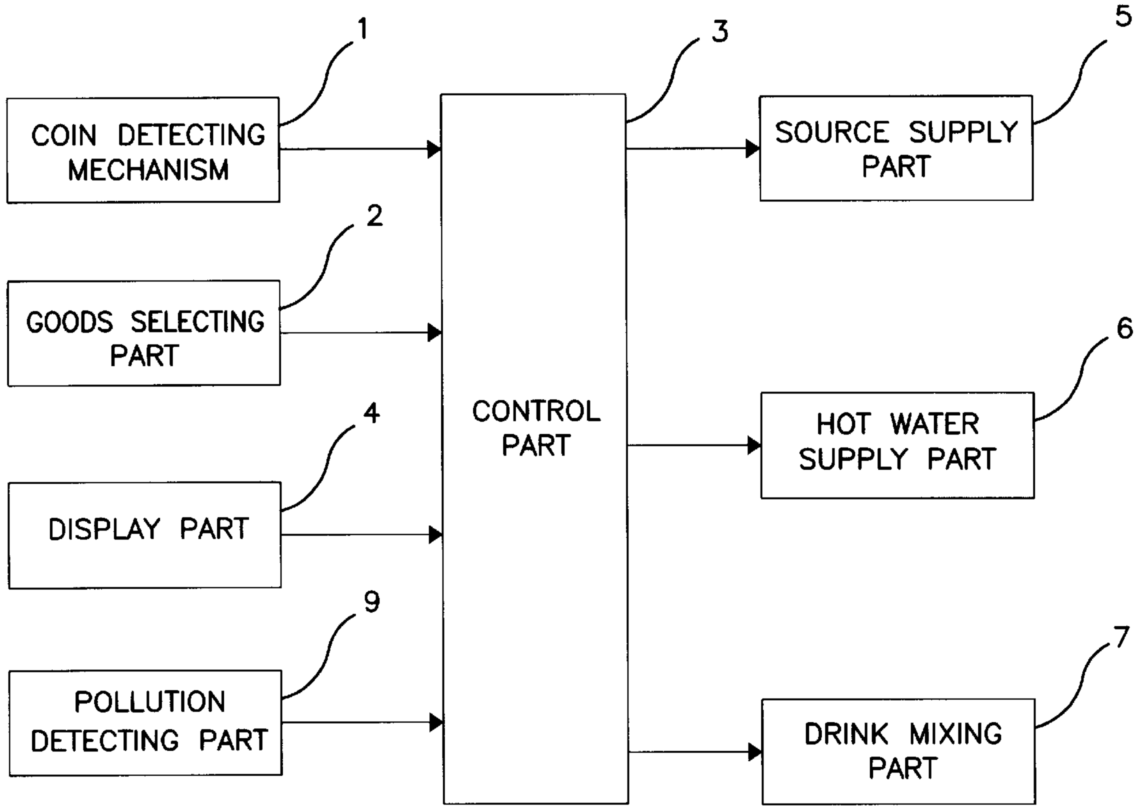
FIG. 3 is a schematic block diagram of an automatic washing apparatus and method for automatically washing a vending machine according to a first embodiment of the present invention.

Referring to FIG. 3, there is shown a schematic block diagram of an automatic washing apparatus for an automatic vending machine according to the present invention. The vending machine comprises a coin detecting mechanism 1, a goods selecting part 2, a control part 3, a display part 4, a beverage source supply part 5, a hot water supply part 6, a drink mixing part 7 and a pollution detecting part 9.

The basic elements (for example, the coin detecting mechanism 1, the goods selecting part 2, the display part 4, the beverage source supply part 5 and the hot water supply part 6) of the invention are similar to those of conventional automatic vending machines and the similar basic elements will be not described hereinafter.

Figure 4:
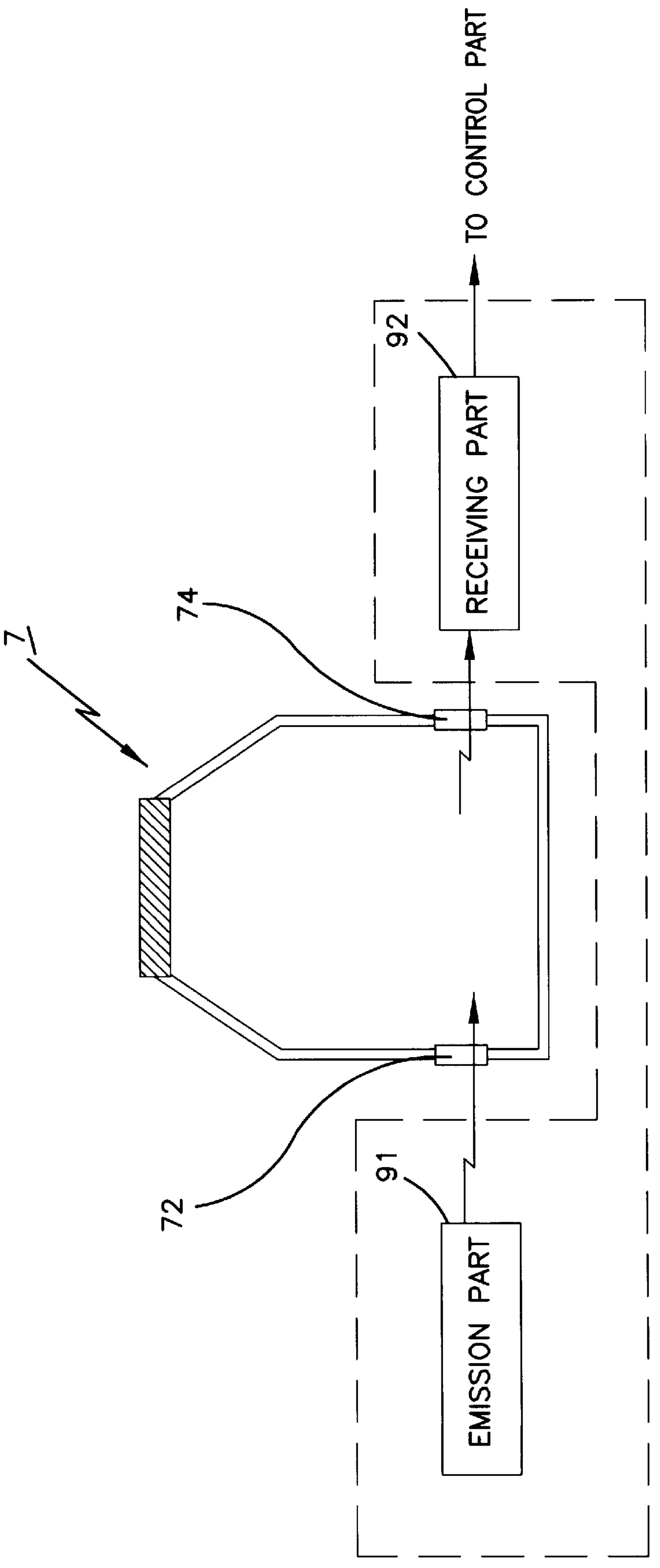
FIG. 4 is a schematic view of a drink mixing part and a pollution detecting part of the automatic washing apparatus shown in FIG. 3.

The drink mixing part 7, as depicted in FIG. 3 and shown in FIG. 4, has two transparent means 72 and 74, which are positioned at certain opposite positions of a vessel so as to allow light to pass through. The pollution detecting part 9 consists of an emission part 91 and a receiving part 92, which are installed outside each of the transparent means 72 and 74 at a predetermined distance. When the emission part 91 generates a light beam, the light passes through transparent means 72 and transparent means 74, after which the receiving part 92 receives the light and provides a signal to the control part 3. The control part 3 compares the light signal level received from the receiving part 92, with a light signal level stored therein. If the received light signal is below the light signal level stored therein, the control part 3 generates a signal to wash the drink mixing part 7.

Figure 5:
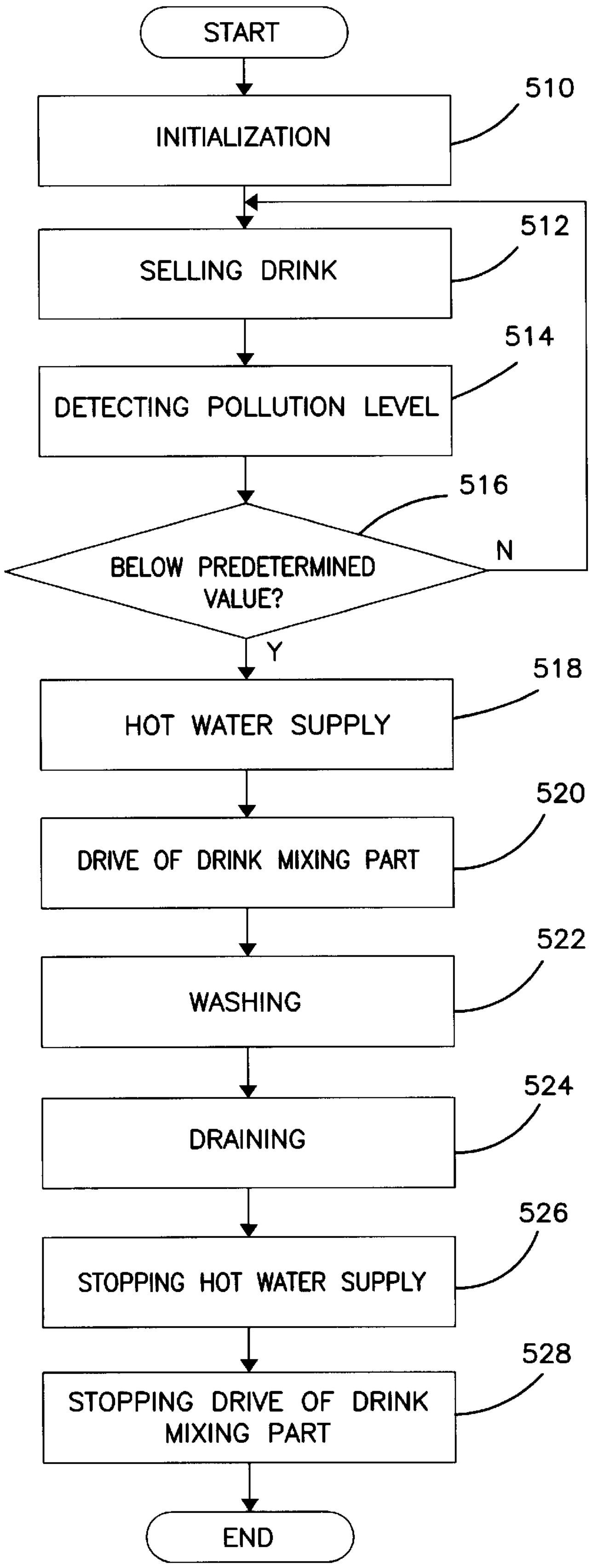
FIG. 5 is a flowchart depicting an automatic washing process of the drink mixing part according to the first embodiment of the present invention.

Now, the automatic washing method for the automatic vending machines according to a first embodiment of the present invention will be described with reference to FIGS. 3 to 5.

When AC voltage (from an external source) is provided to a power part (not shown), the automatic vending machine begins to initialize input parameters as directed by a control signal from the control part 3 at step 510. When coins are inserted through a coin insert slot by a user, the coins are guided to the coin detecting mechanism 1 by a guide means. The coin detecting mechanism 1 provides a signal to the control part 3 to determine the status of the inserted coins and simultaneously determine the total amount of the inserted coins.

After having determined the status of the inserted coins, the control part 3 determines whether the amount of inserted coins is greater than the price of the goods selected by the user. If the amount of the inserted coins is greater than the price of the goods, the control part 3 generates a signal to display the selection availability of goods (for example, a light corresponding to the goods selected by the user is maintained in the "on" state). Accordingly, the display part 4 displays the selection availability of the goods.

After the desired good has been selected by the user via the goods selecting part 2, the control part 3 generates a control signal to supply the beverage source material and the hot water corresponding to the selected drink. The control part 3 also generates a signal to mix the beverage source material and hot water. The source material is supplied to the drink mixing part 7 through the source supply part 5 and the hot water is supplied from the hot water supply part 6 to the drink mixing part 7 according to a control signal of the control part 3. The beverage source material and the hot water are mixed by the drink mixing part 7, and the beverage then is extracted by the drink extracting part 8 through a nozzle so that the selected drink is sold at step 512.

In FIG. 4, the light generated by the emission part 91 of the pollution detecting part 9 is passed through the transparent means 72 and 74, and is received by receiving part 92. Receiving part 92 then provides a signal corresponding to the level of light received to the control part 3. The control part 3 compares the light signal level received from the receiving part 92 with the light signal level stored therein (for example, the light signal level correlating to the minimum allowable light passage, which corresponds to the maximum allowable pollution in mixing part 7). Thereby the extent of the pollution in the drink mixing part 7 is determined at steps 514 and 516.

When the inner part of the drink mixing part 7 has not been polluted but is clean, almost all of the light generated by the emission part 91 is received by receiving part 92, so that the light signal level provided to the control part 3 is high. Conversely, when the inner part of the drink mixing part 7 is polluted, the light received by the receiving part 92 is significantly reduced due to dissipation of the light caused by the pollution material (for example, residual material that mixed with the source material and the hot water). Thus, for polluted inner parts, the light signal level provided to the control part 3 is low.

As a result of the determination at steps 514 and 516, if the light signal level received from the receiving part 92 is above the light signal level stored in the control part 3, the control part 3 is returned to step 512, after which it performs steps 512, 514 and 516 again. If, as a result of the determination at steps 514 and 516, the light signal level received from the receiving part 92 is below the light signal level stored in the control part 3, the control part 3 generates a signal to wash the drink mixing part 7.

To begin the washing, hot water from the hot water supply part 6 is provided to the drink mixing part 7 according to a signal from the control part 3 at step 518. The drink mixing part 7 is driven according to a signal from the control part 3 at step 520 so that the hot water only is mixed in the drink mixing part 7, thereby washing the inner part of the drink mixing part 7 at step 522.

After having washed the drink mixing part 7 for a predetermined time period, the water in the drink mixing part 7 is discharged to a draining vessel through the nozzle at step 524. The hot water supply from the hot water supply part 6 is stopped by a signal from the control part 3 at step 526. The drive of the drink mixing part 7 is stopped by a signal from the control part 3 at step 528. At this point the washing operation of the drink mixing part 7 is completed.

As described above, there is an advantage in the first embodiment of the present invention in that the drink mixing part 7 is automatically washed depending on the pollution level of the part, so that the inner part of the drink mixing part 7 is maintained clean.

Figure 6:
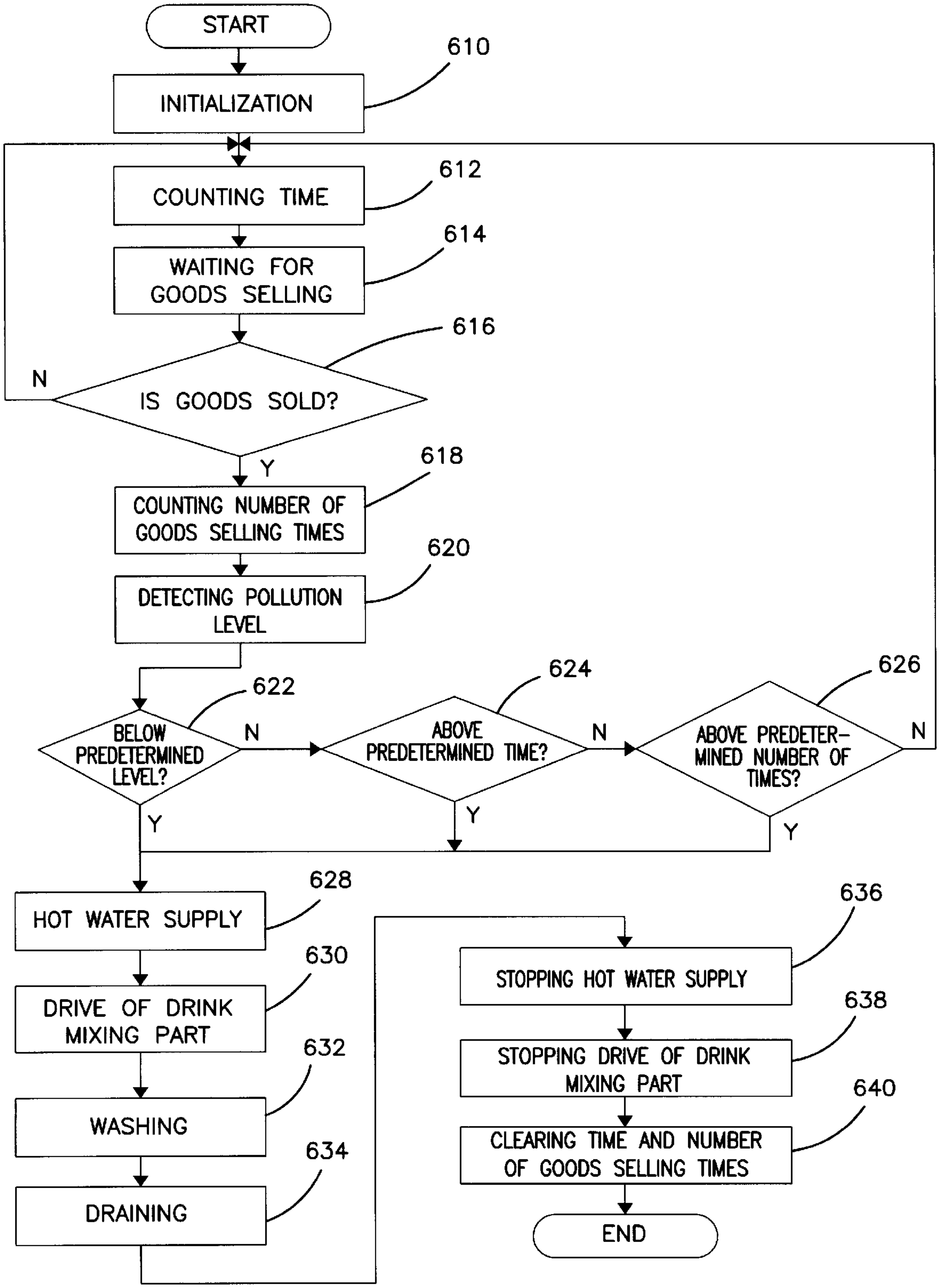
FIG. 6 is a flowchart depicting an automatic washing process of the drink mixing part according to a second embodiment of the present invention.

A second embodiment of the automatic washing process of the drink mixing part for automatic vending machines according to the present invention will be described with reference to FIGS. 3, 4 and 6.

When the time period after selling a beverage exceeds a predetermined time, for example 3 seconds, or when the number of beverages sold exceeds a predetermined number of sales, for example 50 times, the light signal level detected by the receiving part 92 of the pollution detecting part 9 is compared to the light signal level stored in the control part 3. If the light signal received from the receiving part 92 is below the light signal level stored in the control part 3, the control part 3 generates a signal to wash the inner part of the drink mixing part.

The hot water from the hot water supply part 6 is provided to the drink mixing part 7 by a signal from the control part 3. The drink mixing part 7 is driven by a signal from the control part 3, so that the inner part of the drink mixing part 7 is washed.

Now, the automatic washing method for the automatic vending machines according to a second embodiment of the present invention will be described.

When AC voltage (from an external source) is provided to a power part (not shown), the automatic vending machine begins to initialize input parameters as directed by a control signal from the control part 3 at step 610. The automatic vending machine is transferred to a state of waiting for a sale of the goods at step 612 and 614. Simultaneously, control part 3 counts the time.

At step 616, the control part 3 determines whether the goods stored in the automatic vending machine have been sold. If the goods are not sold, the control part 3 is returned to step 612 and continues count. The state of waiting for a sale of goods is maintained at steps 612 and 614. When the goods are eventually sold, the control part 3 counts the number of the goods sold at step 618.

When coins are inserted through a coin insert slot by a user, the coins are guided to the coin mechanism 1 by the guide means. The coin mechanism 1 provides a signal to the control part 3 to determine the status of the inserted coins and the total amount of the inserted coins.

After having determined the total amount of the inserted coins, the control part 3 determines whether the amount of inserted coins is greater than the price of the goods selected by the user. If the amount of inserted coins is greater than the price of goods, the control part 3 generates a signal to display the selections available (for example, a light corresponding to the goods selected by the user is maintained in the "on" state). Accordingly, the display part 4 displays the selection availability of the goods.

After the desired goods have been selected by the user via the goods selecting part 2, the control part 3 generates a control signal to supply the beverage source material and the hot water corresponding to the selected drink. The control part 3 also generates a signal to mix. At this time, the beverage source material is supplied to the drink mixing part 7 through the source supply part 5 and the hot water is supplied from the hot water supply part 6 to the drink mixing part 7 according to a signal from the control part 3. The source material and the hot water are mixed by the drink mixing part 7, and then are extracted by the drink extracting part 8 through the nozzle so that the selected drink is sold.

In FIG. 4, the light generated by the emission part 91 of the pollution detecting part 9 is passed through the transparent means 72 and 74, and is received by receiving part 92, which provides a signal corresponding to the level of light received to the control part 3. The control part 3 compares the light signal level received from the receiving part 92 with the light signal level stored therein (for example, the light signal level correlating to the minimum allowable light passage, which corresponds to the maximum allowable pollution in mixing part 7), thereby determining the extent of the pollution in the drink mixing part 7 at steps 620 and 622.

When the inner part of the drink mixing part 7 has not been polluted but is clean, almost all the light generated by the emission part 91 is received by receiving part 92, so that the light signal level provided to the control part 3 is high. Conversely, when the inner part of the drink mixing part 7 is polluted, the light received by the receiving part 92 is significantly reduced due to the scattering and dissipation of the light caused by the pollution material (for example, a residual material which mixed with the source material and the hot water). Thus, for polluted inner parts, the light signal level provided to the control part 3 is low.

As a result of the determination at steps 620 and 622, if the light signal level received from the receiving part 92 is above the light signal level stored in the control part 3, the control part 3 determines whether the waiting time for sale of goods exceeds a predetermined time, for example 3 hours, at step 624. If, as a result of the determination at step 624, the waiting time for selling the goods does not exceed the predetermined waiting time, the control part 3 determines whether the number of the goods sold, as counted by the control part 3 at step 618, exceeds the predetermined number, for example 50, at step 626.

As a result of the determination at steps 622, 624 and 626, if the light signal level provided from the pollution detecting part 9 is above a predetermined level stored in control part 3, and the waiting time for selling the goods is below the predetermined time, and the number of the goods sold is below the predetermined number, the control part 3 is returned to step 612 and each step 612, 614, 616, 618, 620, 622, 624 and 626 is performed again.

Alternatively, as a result of the determination at steps 622, 624 and 626, if the light signal level provided from the pollution detecting part 9 is below a predetermined level stored in control part 3, or when the waiting time for selling the goods is above the predetermined time stored therein, or when the number of the goods sold is above the predetermined number, the control part 3 generates a signal to wash the inner part of the drink mixing part 7.

The hot water supplied from the hot water supply part 618 is provided to the drink mixing part 7 by a signal from the control part 3 at step 628. The drink mixing part 7 is driven by a signal from the control part 3 at step 630 so that hot water only is mixing in the drink mixing part 7, thereby washing the drink mixing part 7 at step 632.

After having washed the drink mixing part 7 for a predetermined time, the water is discharged to a draining vessel through the nozzle at step 634. The hot water supply from the hot water supply part 6 is stopped by a signal from the control part 3 at step 636. The drive of the drink mixing part 7 is stopped by a signal from the control part 3 at step 638. The washing operation of the drink mixing part 7 is then complete.

Subsequently, the control part 3 resets the time to perform the next washing operation of the drink mixing part 7 and simultaneously resets the number of the goods sold at step 640.

As described above, there is an advantage in this second embodiment of the present invention in that the drink mixing part 7 is automatically washed depending on any of the pollution level, the time since the last good was sold, or the number of goods sold, so that the inner part of the drink mixing part 7 is maintained clean.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic washing apparatus for an automatic vending machine, the washing apparatus comprising:

(a) a pollution detecting part for detecting a pollution level in a drink mixing part and for generating a signal;

(b) a timer for counting time;

(c) a goods sold counter for counting the number of goods sold;

(d) a hot water supply part having hot water contained therein; and (e) a control part adapted for and capable of receiving the signal from the pollution detecting part and comparing the received signal to a predetermined level to determine the pollution level, comparing the counted time to a predetermined time period, and comparing the number of goods sold to a predetermined number of goods sold, the control part further adapted for and capable of generating a signal to the hot water supply part to supply hot water to the drink mixing part, wherein the hot water supplied to the drink mixing part washes the drink mixing part.

2. The apparatus according to claim 1 wherein the drink mixing part comprises a transparent vessel, and the pollution detecting part comprises an emission part for emitting light and a receiving part for receiving the light, the emission part and the receiving part positioned oppositely on either side of the transparent vessel.

3. A method of automatically washing a drink mixing part in an automatic vending machine, the method comprising:

detecting a pollution level in a drink mixing part by:

(a) emitting a light from a emitting part through the drink mixing part, and receiving the light on a receiving part;

(b) comparing the received light to a predetermined level; washing the drink mixing part by:

(a) supplying hot water from a hot water supply part to the drink mixing part;

(b) driving the drink mixing part; completing the washing by:

(a) discharging the water from the drink mixing part;

(b) stopping the supply of hot water; and (c) stopping the drive of the drink mixing part, wherein the steps of detecting, washing and completing are controlled by a control part.

4. A method of automatically washing a drink mixing part in an automatic vending machine, the method comprising.

(a) initializing a control part with predetermined input parameters for a pollution level, a number of goods sold, and a time period;

(b) counting the time period and transferring the vending machine to a state of a waiting for a sale of goods;

(c) counting the number of goods sold;

(d) detecting the pollution level of a drink mixing part;

(e) comparing the input parameter for the pollution level with the measured pollution level;

(f) comparing the input parameter for the time period with the counted time period;

(g) comparing the input parameter for the number of goods sold with the counted number of goods sold;

wherein, if the drink mixing part is determined to be polluted, or if the counted time period is greater than the input parameter for the time period, or if the number of the goods sold is greater than the input parameter for the number of good sold, then:

(i) washing the drink mixing part by mixing hot water in the drink mixing part;

(ii) discharging the water from the drink mixing part, stopping the hot water supply from the hot water supply part, and simultaneously stopping the drive of the drink mixing part; and (iii) resetting the counted time period and the number of the goods sold.

* * * * *